(12) United States Patent
Tame

(10) Patent No.: US 7,090,251 B2
(45) Date of Patent: Aug. 15, 2006

(54) SEAT ASSEMBLY FOR A MOTOR VEHICLE HAVING A POSITIONABLE SEAT BELT TOWER

(75) Inventor: Omar D. Tame, West Bloomfield, MI (US)

(73) Assignee: Magna Seating Systems Inc., Aurora (CA)

( * ) Notice: Subject to any disclaimer, the term of this patent is extended or adjusted under 35 U.S.C. 154(b) by 327 days.

(21) Appl. No.: 10/332,928

(22) PCT Filed: Jul. 13, 2001

(86) PCT No.: PCT/US01/22067

§ 371 (c)(1),
(2), (4) Date: Oct. 1, 2003

(87) PCT Pub. No.: WO02/06091

PCT Pub. Date: Jan. 24, 2002

(65) Prior Publication Data

US 2005/0012379 A1 Jan. 20, 2005

(51) Int. Cl.
*B60R 22/20* (2006.01)
(52) U.S. Cl. ....................................................... 280/808
(58) Field of Classification Search ............. 280/801.1, 280/808, 801.2; 297/468, 483, 486, 378.1, 297/378.12
See application file for complete search history.

(56) References Cited

U.S. PATENT DOCUMENTS

| | | |
|---|---|---|
| 5,123,673 A | 6/1992 | Tame |
| 5,308,116 A | 5/1994 | Zawisa et al. |
| 5,330,228 A | 7/1994 | Krebs et al. |
| 5,427,412 A | 6/1995 | Staniszewski |
| 5,700,055 A | 12/1997 | Davidson et al. |
| 5,730,499 A | 3/1998 | Salisbury, Jr. |
| 5,733,013 A | 3/1998 | Brown |
| 5,879,055 A | 3/1999 | Dishner et al. |
| 5,941,604 A | 8/1999 | Futschik et al. |
| 5,988,758 A | 11/1999 | Heintzelman et al. |
| 6,065,810 A | 5/2000 | Koenig et al. |
| 6,152,490 A | 11/2000 | Suzuki et al. |
| 6,192,565 B1 | 2/2001 | Tame |

FOREIGN PATENT DOCUMENTS

GB 2 278 535 A 7/1994

*Primary Examiner*—David R. Dunn
*Assistant Examiner*—Laura B Rosenberg
(74) *Attorney, Agent, or Firm*—Clark Hill PLC

(57) ABSTRACT

A seat assembly is disclosed for use in a motor vehicle. The seat assembly includes a seat cushion. The seat cushion is operatively connected to the motor vehicle. The seat cushion supports an occupant on the seat assembly. A seat back is pivotally coupled to the seat cushion. The seat back is movable between a generally upright seating position and a forwardly folded dumped position. The forwardly folded dump position has the seat back positioned against the seat cushion. A shoulder belt tower is fixedly secured to the seat back and supports a shoulder belt. The tower includes a tower base and a tower extension. The tower extension slidingly engages the tower base. A positioning device is coupled between the tower base and the tower extension. The positioning device automatically slides the tower extension between a use position extending out from the seat back for positioning the shoulder belt above the seat back for positioning the shoulder belt above the seat back and a stowed position recessed within the seat back.

7 Claims, 3 Drawing Sheets

SEAT ASSEMBLY FOR A MOTOR VEHICLE HAVING A POSITIONABLE SEAT BELT TOWER

BACKGROUND ART

1. Field of the Invention

The invention relates to a seat assembly for a motor vehicle. More specifically, the invention relates to a seat assembly having a positionable seat belt tower for an over the shoulder seat belt.

2. Description of the Related Art

Automotive vehicles include seat assemblies for supporting an occupant in the vehicle. The seat assemblies typically include a generally horizontal seat cushion and a generally upright seat back. A recliner mechanism often pivotally interconnects the seat back to the seat cushion for pivotal movement between the upright position, one or more rearwardly reclined position and/or a forwardly folded dumped position. Automotive vehicles include not only a first row of seat assemblies, i.e., driver and passenger seats, they also often include a second row, or even third row, of seat assemblies position behind the first row of seats. The seat back of the second and third row of seat assemblies may be pivotal to the forwardly folded dumped position to provide an extended cargo area in the rear of the vehicle.

It is further becoming increasingly common to connect the components of a seat restraint system, i.e., shoulder and lap belts, directly to the seat assembly for restraining the occupant in the seat assembly and vehicle. Such seat restraint systems are commonly referred to in the art as a seat integrated restraint or SIR. The seat integrated restraint typically includes a lap belt and a shoulder belt fixedly secured and supported by the seat assembly. The seat back commonly includes a shoulder belt tower for positioning and supporting the shoulder belt above the shoulder of the occupant seated on the seat cushion. The tower typically projects upwardly above the top of the seat back. However, when the seat assembly is used as a rear seat, that is, a second or third row passenger seat, the tower may engage the first row of seats when the seat back is pivoted to the forwardly folded dumped position.

Therefore, it is desirable to provide a seat assembly having a seat integrated restraint and a shoulder belt tower which is stowable within the scat back when the seat back is pivoted to the forwardly folded dumped position.

One example of a seat belt positioning device for a shoulder portion thereof is disclosed in U.S. Pat. No. 5,330,228. This patent discloses a seat belt restraint system having an adjustable shoulder positioning device. The shoulder positioning device secured to the head rest of the seat assembly. A seat belt extending from a seat belt tower is realigned and redirected, depending on the position of the head rest, by size of the occupant of the seat. An eye has the seat belt extending therethrough. The eye has sensors to sense pressure applied thereto by the seat belt. A control unit moves the head rest up or down to relieve the pressure on the eye, resulting in a properly positioned head rest in the event of an accident. This system does not, however, disclosed a seat assembly having a seat belt tower that is movable to stowed position out of the way during the collapsing of the seat back into its forward dumped position.

SUMMARY OF THE INVENTION

A seat assembly is disclosed for use in a motor vehicle. The seat assembly includes a seat cushion. The seat cushion is operatively connected to the motor vehicle. The seat cushion supports an occupant on the seat assembly. A seat back is pivotally coupled to the seat cushion. The seat back is movable between a generally upright seating position and a forwardly folded dumped position. The forwardly folded dump position has the seat back positioned against the seat cushion. A shoulder belt tower is fixedly secured to the seat back and supports a shoulder belt. The tower includes a tower base and a tower extension. The tower extension slidingly engages the tower base. A positioning device is coupled between the tower base and the tower extension. The positioning device automatically slides the tower extension between a use position extending out from the seat back for positioning the shoulder belt above the seat back and a stowed position recessed within the seat back.

BRIEF DESCRIPTION OF THE DRAWINGS

Advantages of the invention will be readily appreciated as the same becomes better understood by reference to the following detailed description when considered in connection with the accompanying drawings, wherein.

DETAILED DESCRIPTION OF THE PREFERRED EMBODIMENTS

Figure 1:
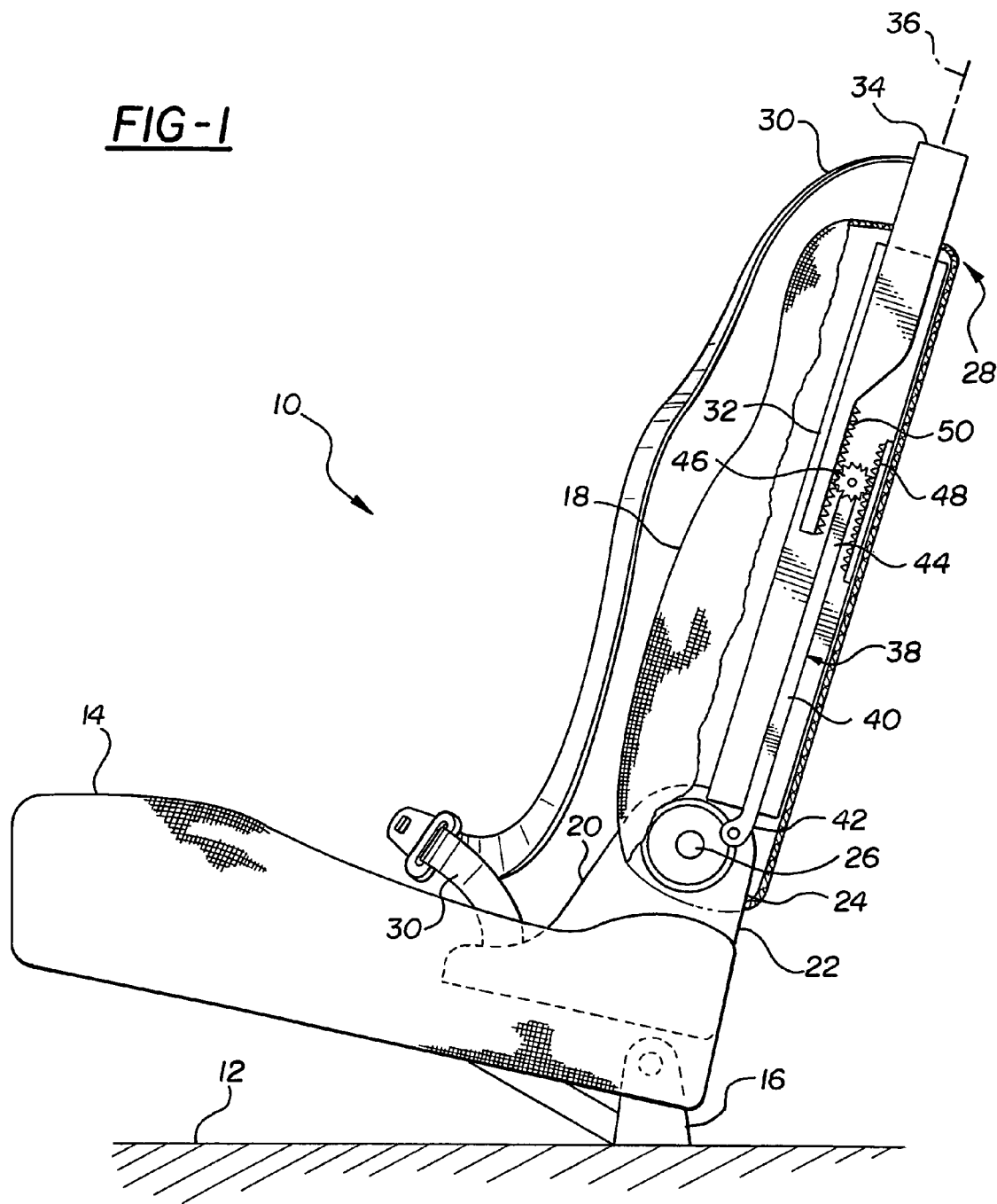
FIG. 1 is a cross-sectional side view of one embodiment of the invention in an upright seating position.
Figure 2:
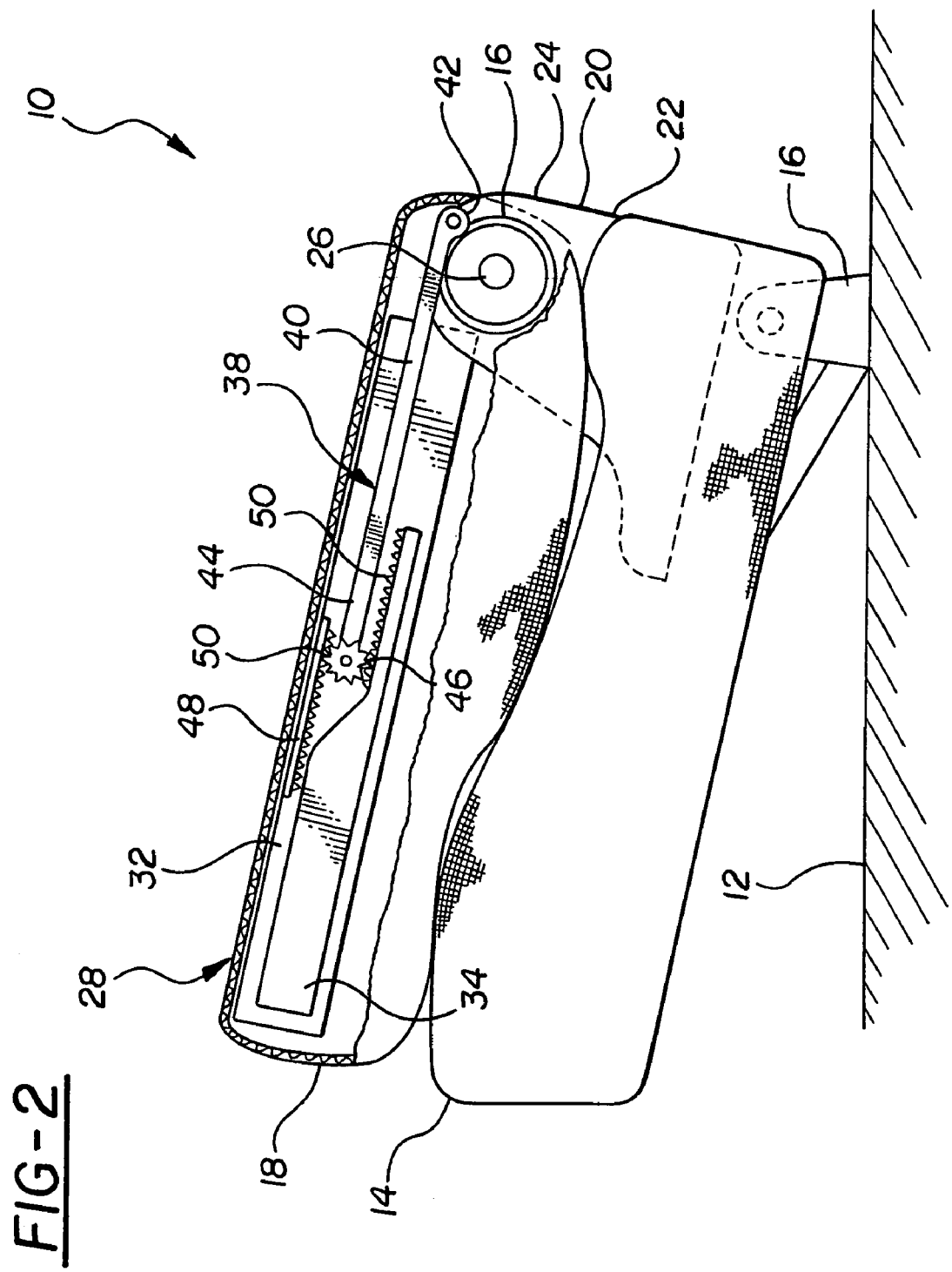
FIG. 2 is a cross-sectional side view of one embodiment of the invention in a forwardly folded dumped position.
Figure 3:
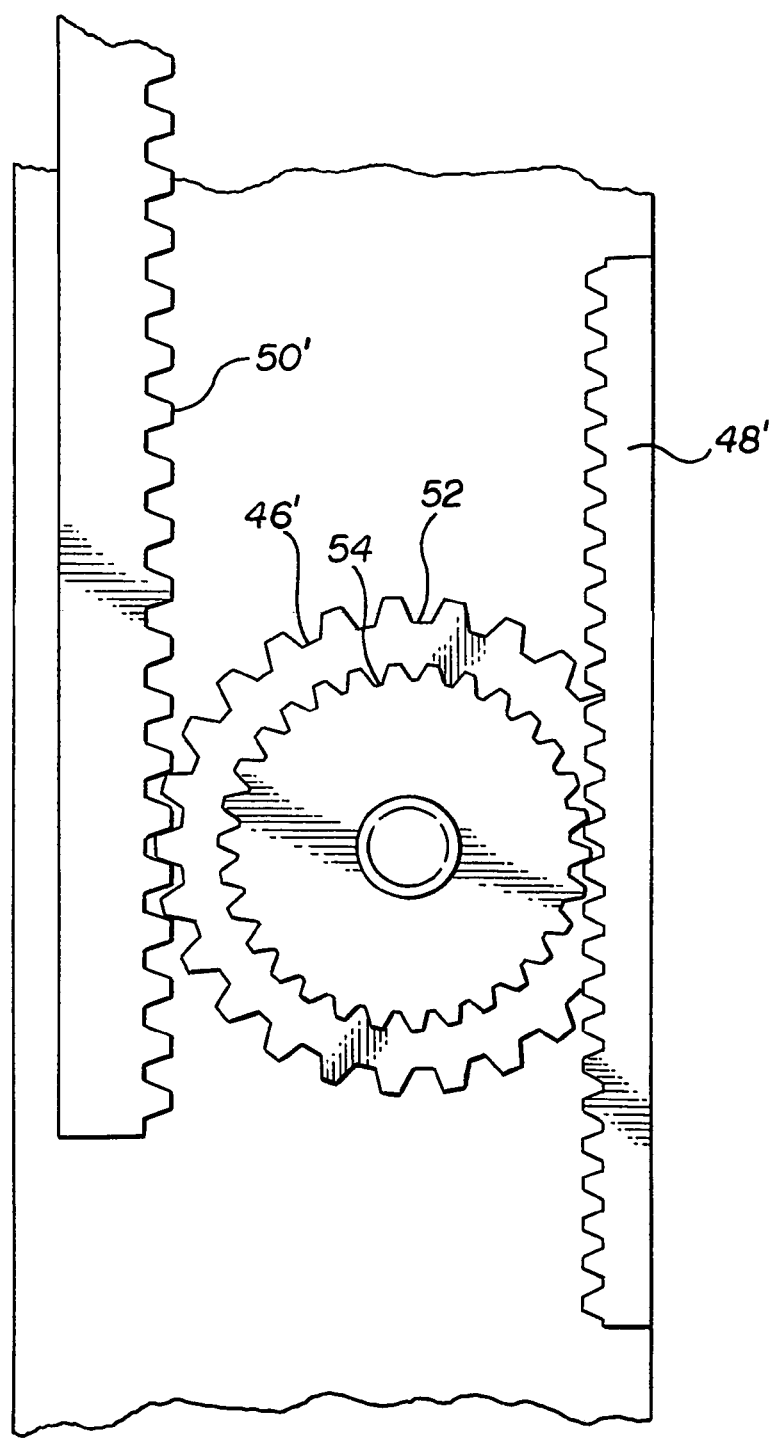
FIG. 3 is a side view of an alternative embodiment for a pinion gear used in a positioning device of the invention.

Referring to the Figures, wherein like primed numerals represent similar elements in different embodiments, a seat assembly is generally indicated at 10. The seat assembly 10 is used in a motor vehicle, represented by a vehicle floor 12 in the Figures. While the seat assembly 10 may be any seat in the motor vehicle 12, it is contemplated that the seat assembly 10 would be used in rows subsequent the row of seats including the driver seat.

The seat assembly 10 includes a seat cushion 14. The seat cushion 14 is operatively connected to the vehicle floor 12 of the motor vehicle for supporting a seat occupant on the seat assembly 10. The seat cushion 14 provides support for the occupant. The seat cushion 14 is secured to the vehicle floor 12 in any number of manners as is well known in the art. In the Figures, the seat cushion 14 is secured via a bracket 16.

The seat assembly 10 also includes a seat back 18. The seat back 18 is pivotally coupled to the seat cushion 14. A hinge 20 secures the seat back 18 to the seat assembly 10 allowing for the pivotal movement between a generally upright seating position and a forwardly folded dumped position. The hinge 20 may extend out from the bracket 16 or, in the alternative, may extend out of a subassembly (not shown) in the seat cushion 14. The hinge 20 includes a stationary base 22 and a hinged member 24. The stationary base 22 is the portion of the hinge 20 that extends up from the bracket 16 and does not move. The hinged member 24 pivots with respect to the stationary base 22 about pivot pin 26, allowing the seat back 18 to move between its upright seating position and the forwardly folded dumped position.

The seat assembly 10 also includes a shoulder belt tower 28 that is fixedly secured to the seat back 18. The shoulder belt tower 28 is a part of a seat belt restraint assembly (not shown) used to supply and retract a seat belt 30 when used and stored, respectively.

The shoulder belt tower 28 includes a tower base 32 and a tower extension 34. The tower extension 34 slidingly engages the tower base 32. In the embodiment shown, the tower base 32 is an outer sleeve with the tower extension 34 extending therethrough in a telescoping manner. It should be appreciated by those skilled in the art that the tower base 32 and extension 34 may be configured in a manner other than one that which results in a telescoping relationship as long as the tower extension 34 moves with respect to the tower base 32 along a path that is parallel to a longitudinal axis 36 of the tower base 32.

The seat assembly 10 also includes a positioning device 38. The positioning device 38 is coupled between the tower base 32 and the tower extension 34. The positioning device 38 automatically slides the tower extension 34 between its use position extending out from the seat back 18 for positioning the shoulder belt 30 above the seat back 18 and its stowed position recessed within said seat back.

The positioning device 38 includes an elongated member 40 extending through at least a portion of the seat back 18. The elongated member 40 has a fixed end 42 pivotally secured to the stationary base 22 of the hinge 20. The fixed end 42 is secured to the stationary base 22 at a position rearward thereof. This placement results in the elongated member 40 moving further back into the seat back 18 as the seat back 18 is moved toward the forwardly folded dump position.

The elongated member 40 of the positioning device 38 extends from the fixed end 42 to an engagement end 44. The engagement end 44 engages each of the tower base 32 and the tower extension 34. The engagement end 44 operates to define the relative position of the tower extension 34 with respect to the tower base 32.

The engagement end 44 includes a pinion gear 46. The pinion gear 46 engages the tower base 32 and the tower extension 34 to move the tower extension 34 with respect to the tower base 32 and, hence, the seat back 18.

The shoulder belt tower 28 includes two racks, namely a base rack 48 and an extension rack 50. The base rack 48 is secured to the tower base 32 and is engaged by the pinion gear 46. The extension rack 50 is secured to the tower extension 34 and engaged by the pinion gear 46. Therefore, movement of the seat back 18 will move the positioning device 38 with respect thereto which will, in turn, force the pinion gear 46 to rotate as it moves along the base rack 48. The rotation of the pinion gear 46 moves the extension rack 50 and the tower extension 34 along therewith.

While the preferred embodiment includes a simple pinion gear 46 and racks 48, 50 having teeth of equal size, an alternative embodiment may include racks 48', 50' having teeth of unequal size. In this embodiment, the pinion gear 46' would have a first pinion 52 and a second pinion 54. The two pinions 52, 54 would be coaxial and would rotate through the identical paths. The size of teeth along each of the pinions 52, 54 would differ to match the teeth size of the respectively engaged racks 48', 50'. This would result in having a variance to the 1:1 ration of relative movement therebetween.

The invention has been described in an illustrative manner. It is to be understood that the terminology, which has been used, is intended to be in the nature of words of description rather than of limitation.

Many modifications and variations of the invention are possible in light of the above teachings. Therefore, within the scope of the appended claims, the invention may be practiced other than as specifically described.

I claim:

1. A seat assembly for use in a motor vehicle, said seat assembly comprising:
    a seat cushion operatively connected to the motor vehicle for supporting a seat occupant on said seat assembly;
    a seat back pivotally coupled to said seat cushion for movement between a generally upright seating position and a forwardly folded dumped position against said seat cushion;
    a hinge pivotally connecting said seat back to said seat cushion, said hinge including a stationary base and a hinged member;
    a shoulder belt tower fixedly secured to said seat back for supporting a shoulder belt, said tower including a tower base and a tower extension, said tower extension slidingly engaging said tower base;
    a positioning device coupled between said tower base and said tower extension for automatically sliding said tower extension between a use position extending out from said seat back for positioning the shoulder belt above said seat back and a stowed position recessed within said seat back, said positioning device including a fixed end pivotally secured to said stationary base of said hinge and an engagement end for engaging each of said tower base and said tower extension, said engagement end including a pinion gear; and
    wherein said tower base includes a base rack extending therealong, said base rack engaged by said pinion gear.

2. A seat assembly as set forth in claim 1 wherein said tower extension includes an extension rack extending therealong, said extension rack engaged by said pinion gear such that said extension rack and said tower extension move with respect to said tower base when said seat back is moved between said upright seating position and said forwardly folded dumped position.

3. A seat assembly for use in a motor vehicle, said seat assembly comprising:
    a seat cushion operatively connected to the motor vehicle for supporting a seat occupant on said seat assembly;
    a hinge fixedly secured to the motor vehicle, said hinge including a stationary base and a hinged member;
    a seat back fixedly secured to said hinged member of said hinge for movement between a generally upright seating position and a forwardly folded dumped position against said seat cushion;
    a shoulder belt tower fixedly secured to said seat back for supporting a shoulder belt, said tower including a tower base and a tower extension, said tower extension slidingly engaging said tower base;
    a positioning device coupled between said tower base and said tower extension for automatically sliding said tower extension between a use position extending out from said seat back for positioning the shoulder belt above said seat back and a stowed position recessed within said seat back, said positioning device including a pinion gear extending between said tower base and said tower extension for moving said tower extension with respect to said tower base, a fixed end pivotally secured to said stationary base of said hinge, and an engagement end for engaging each of said tower base and said tower extension wherein said engagement end includes said pinion gear; and
    wherein said tower base includes a base rack extending therealong, said base rack engaged by said pinion gear.

4. A seat assembly as set forth in claim 3 wherein said tower extension includes an extension rack extending therealong, said extension rack engaged by said pinion gear such that said extension rack and said tower extension move with respect to said tower base when said seat back is moved between said upright seating position and said forwardly folded dumped position.

5. A seat assembly as set forth in claim 4 wherein said pinion gear is a single gear.

6. A seat assembly as set forth in claim 5 wherein said base rack includes base teeth and said extension rack includes extension teeth such that said base teeth and said extension teeth are of equal size.

7. A seat assembly as set forth in claim 5 wherein said base rack includes base teeth and said extension rack includes extension teeth such that said base teeth and said extension teeth differ in size.

* * * * *